(12) United States Patent
Bessemer et al.

(10) Patent No.: US 11,203,133 B2
(45) Date of Patent: Dec. 21, 2021

(54) METHOD AND APPARATUS FOR POLYMER DRYING USING INERT GAS

(71) Applicant: Novatec, Inc., Baltimore, MD (US)

(72) Inventors: Conrad Bessemer, Millersville, MD (US); Mark Haynie, Pasadena, MD (US); Gregory Michael Washburn, Ellicot City, MD (US); Thomas Trevor Bludis, Reisterstown, MD (US)

(73) Assignee: Novatec, Inc., Baltimore, MD (US)

( * ) Notice: Subject to any disclaimer, the term of this patent is extended or adjusted under 35 U.S.C. 154(b) by 107 days.

(21) Appl. No.: 16/732,513

(22) Filed: Jan. 2, 2020

(65) Prior Publication Data

US 2020/0139585 A1 May 7, 2020

Related U.S. Application Data

(63) Continuation of application No. 16/373,987, filed on Apr. 3, 2019, now abandoned.

(Continued)

(51) Int. Cl.
*F26B 3/00* (2006.01)
*B29B 13/06* (2006.01)
(Continued)

(52) U.S. Cl.
CPC .............. *B29B 13/065* (2013.01); *F26B 3/06* (2013.01); *F26B 17/14* (2013.01); *F26B 21/14* (2013.01); *F26B 2200/08* (2013.01)

(58) Field of Classification Search
CPC .......... B29B 13/065; F26B 3/06; F26B 17/14; F26B 21/14; F26B 21/04; F26B 21/08; F26B 21/003; F26B 21/10

(Continued)

(56) References Cited

U.S. PATENT DOCUMENTS 512,673 A 1/1894 Mason
753,597 A 3/1904 Long
(Continued)

FOREIGN PATENT DOCUMENTS

AU 417596 6/1971
CA 1100402 5/1981
(Continued)

OTHER PUBLICATIONS

Thirty-nine page brochure entitled "Maguire Low Pressure Dryer: Sep. 7, 2000: Installation Operation Maintenance", 2000.
(Continued)

*Primary Examiner* — John P McCormack
(74) *Attorney, Agent, or Firm* — Fox Rothschild LLP

(57) ABSTRACT

Method and apparatus for drying granular resin material by heating compressed air to a temperature prescribed for gas separation membrane operation, presenting the heated compressed air to a membrane separating out oxygen-size and smaller molecules to provide a stream of gas molecules of at least nitrogen-size at a pressure substantially that of the compressed air, heating the stream of gas molecules of at least nitrogen-size to a temperature at which dew point of the stream is no higher than −40 degrees F., and introducing the heated stream of gas molecules into a chamber for upward flow to atmosphere through granular resin material in the chamber.

6 Claims, 5 Drawing Sheets

Related U.S. Application Data

(60) Provisional application No. 62/652,612, filed on Apr. 4, 2018.

(51) Int. Cl.
*F26B 3/06* (2006.01)
*F26B 17/14* (2006.01)
*F26B 21/14* (2006.01)

(58) Field of Classification Search
USPC .................. 34/443, 507, 413, 436, 430, 446
See application file for complete search history.

(56) References Cited

U.S. PATENT DOCUMENTS

| | | |
|---|---|---|
| 960,857 A | 6/1910 | Eggert |
| 1,520,017 A | 12/1924 | Denton |
| 1,620,289 A | 3/1927 | Ridley |
| 1,625,451 A | 4/1927 | Brown |
| 2,161,190 A | 6/1939 | Paull |
| 2,550,240 A | 4/1951 | Geiger et al. |
| 2,569,085 A | 9/1951 | David et al. |
| 2,587,338 A | 2/1952 | Lee et al. |
| 3,111,115 A | 11/1963 | Best |
| 3,113,032 A | 12/1963 | Wayne |
| 3,115,276 A | 12/1963 | Johanningmeier |
| 3,138,117 A | 6/1964 | Dorey |
| 3,144,310 A | 8/1964 | Glatt et al. |
| 3,209,898 A | 10/1965 | Beebe et al. |
| 3,348,848 A | 10/1967 | Lucking et al. |
| 3,395,634 A | 8/1968 | Smith, Jr. |
| 3,470,994 A | 10/1969 | Schnell et al. |
| 3,554,143 A | 1/1971 | Rodgers |
| 3,597,850 A | 8/1971 | Jenkins |
| 3,628,508 A | 12/1971 | Kummel |
| 3,630,352 A | 12/1971 | Morse |
| 3,649,202 A | 3/1972 | Bajek et al. |
| 3,698,098 A | 10/1972 | Ramsay |
| 3,780,446 A | 12/1973 | Frimberger |
| 3,834,038 A | 9/1974 | Janda |
| 3,959,636 A | 5/1976 | Johnson et al. |
| 3,969,314 A | 7/1976 | Grigull |
| 3,985,262 A | 10/1976 | Nauta |
| 4,026,442 A | 5/1977 | Orton |
| 4,108,334 A | 8/1978 | Moller |
| 4,127,947 A | 12/1978 | Webb et al. |
| 4,148,100 A | 4/1979 | Moller |
| 4,179,819 A | 12/1979 | Pryor |
| 4,219,136 A | 8/1980 | Williams et al. |
| 4,294,020 A | 10/1981 | Evans |
| 4,322,970 A | 4/1982 | Peter |
| 4,347,670 A | 9/1982 | Wear et al. |
| 4,351,119 A | 9/1982 | Meunier |
| 4,354,622 A | 10/1982 | Wood |
| 4,357,830 A | 11/1982 | Kohama et al. |
| 4,364,666 A | 12/1982 | Keyes |
| 4,394,941 A | 7/1983 | Recine |
| 4,399,697 A | 8/1983 | Kohama et al. |
| 4,402,436 A | 9/1983 | Hellgren |
| 4,413,426 A | 11/1983 | Graff |
| 4,414,847 A | 11/1983 | Kohama et al. |
| 4,439,213 A * | 3/1984 | Frey ...................... C01B 21/045 95/98 |
| 4,454,943 A | 6/1984 | Moller |
| 4,475,672 A | 10/1984 | Whitehead |
| 4,479,309 A | 10/1984 | Tolson |
| 4,498,783 A | 2/1985 | Rudolph |
| 4,505,407 A | 3/1985 | Johnson |
| 4,510,106 A | 4/1985 | Hirsch |
| 4,525,071 A | 6/1985 | Horowitz et al. |
| 4,531,308 A | 7/1985 | Neilson et al. |
| 4,544,279 A | 10/1985 | Rudolph |
| 4,581,704 A | 4/1986 | Mitsukawa |
| 4,603,489 A | 8/1986 | Goldberg |
| 4,619,379 A | 10/1986 | Biehl |
| 4,705,083 A | 11/1987 | Rossetti |
| 4,732,318 A | 3/1988 | Osheroff |
| 4,756,348 A | 7/1988 | Moller |
| 4,793,711 A | 12/1988 | Ohlson |
| 4,830,508 A | 5/1989 | Higuchi et al. |
| 4,848,534 A | 7/1989 | Sandwall |
| 4,850,703 A | 7/1989 | Hanaoka et al. |
| 4,924,601 A | 5/1990 | Bercaw |
| 4,938,061 A | 7/1990 | Carp |
| 4,952,856 A | 8/1990 | Schmitz |
| 5,064,328 A | 11/1991 | Raker |
| 5,110,521 A | 5/1992 | Moller |
| 5,115,577 A | 5/1992 | Kramer |
| 5,116,547 A | 5/1992 | Tsukahara et al. |
| 5,132,897 A | 7/1992 | Allenberg |
| 5,143,166 A | 9/1992 | Hough |
| 5,148,943 A | 9/1992 | Moller |
| 5,172,489 A | 12/1992 | Moller |
| 5,205,050 A | 4/1993 | Masaaki et al. |
| 5,225,210 A | 7/1993 | Shimoda |
| 5,252,008 A | 10/1993 | May, III et al. |
| 5,261,743 A | 11/1993 | Moller |
| 5,285,930 A | 2/1994 | Nielsen |
| 5,293,697 A | 3/1994 | Kawakami |
| 5,340,241 A | 8/1994 | Thiele et al. |
| 5,340,949 A | 8/1994 | Fujimura et al. |
| 5,341,961 A | 8/1994 | Hausam |
| 5,409,991 A | 4/1995 | Mitsuno et al. |
| 5,423,455 A | 6/1995 | Ricciardi et al. |
| 5,426,415 A | 6/1995 | Prachar et al. |
| 5,433,020 A | 7/1995 | Leech |
| 5,487,225 A | 1/1996 | Downie |
| 5,501,143 A | 3/1996 | Thom, Jr. |
| 5,513,445 A | 5/1996 | Farrag |
| 5,527,107 A | 6/1996 | Weibel |
| 5,594,035 A | 1/1997 | Walsh |
| 5,632,805 A | 5/1997 | Woodard |
| 5,651,401 A | 7/1997 | Cados |
| 5,732,478 A | 3/1998 | Chapman |
| 5,736,683 A | 4/1998 | Howard |
| 5,767,453 A | 6/1998 | Wakou et al. |
| 5,767,455 A | 6/1998 | Mosher |
| 5,780,779 A | 7/1998 | Kitamura et al. |
| 5,807,422 A | 9/1998 | Grgich et al. |
| 5,810,961 A | 9/1998 | Andersen et al. |
| 5,843,513 A | 12/1998 | Wilke et al. |
| 5,896,675 A | 4/1999 | Holler et al. |
| 6,079,122 A | 6/2000 | Rajkovich |
| 6,151,795 A | 11/2000 | Hoffman et al. |
| 6,154,980 A | 12/2000 | Maguire |
| 6,158,147 A * | 12/2000 | Smith ................... F26B 21/001 34/168 |
| 6,315,902 B1 | 11/2001 | Collasius et al. |
| 6,321,461 B1 | 11/2001 | Ogasahara |
| 6,357,294 B1 | 3/2002 | Nakada |
| 6,449,875 B1 | 9/2002 | Becker et al. |
| 6,584,701 B1 | 7/2003 | Brown et al. |
| 7,007,402 B1 | 3/2006 | Gillette |
| 7,234,247 B2 | 6/2007 | Maguire |
| 7,343,700 B2 | 3/2008 | Zlotos |
| 7,347,007 B2 | 3/2008 | Maguire |
| 8,141,270 B2 | 3/2012 | Gera, Jr. |
| 8,776,392 B2 | 7/2014 | Maguire |
| RE45,408 E | 3/2015 | Maguire |
| RE45,501 E | 5/2015 | Maguire |
| 2002/0024162 A1 | 2/2002 | Maguire |
| 2002/0092525 A1 | 7/2002 | Rump et al. |
| 2005/0092675 A1 | 5/2005 | Nakahara et al. |
| 2006/0168843 A1 | 8/2006 | Zlotos |
| 2007/0199203 A1* | 8/2007 | Federico ............ B01D 53/261 34/416 |
| 2007/0234702 A1 | 10/2007 | Hagen et al. |
| 2008/0029546 A1 | 2/2008 | Schuld |
| 2008/0237361 A1 | 10/2008 | Wang |
| 2009/0059714 A1 | 3/2009 | Pikus et al. |
| 2010/0170102 A1 | 7/2010 | Chih |
| 2010/0217445 A1 | 8/2010 | Moretto |
| 2010/0229420 A1 | 9/2010 | Garrido |
| 2011/0035959 A1 | 2/2011 | Gera, Jr. |

(56) References Cited

U.S. PATENT DOCUMENTS

| | | |
|---|---|---|
| 2011/0106475 A1 | 5/2011 | Wigen |
| 2011/0283554 A1 | 11/2011 | Kuhnau et al. |
| 2012/0066924 A1 | 3/2012 | Ando |
| 2012/0311884 A1 | 12/2012 | Eisinger et al. |
| 2014/0239533 A1 | 8/2014 | Maguire |
| 2015/0300737 A1 | 10/2015 | Maguire |
| 2015/0316320 A1 | 11/2015 | Maguire |
| 2016/0151936 A1 | 6/2016 | Maguire |
| 2017/0261261 A1 | 9/2017 | Maguire |

FOREIGN PATENT DOCUMENTS

| | | |
|---|---|---|
| CH | 688217 | 6/1997 |
| CN | 101968300 A | 2/2011 |
| CN | 203331276 U | 12/2013 |
| DE | 318127 | 3/1914 |
| DE | 421770 | 11/1925 |
| DE | 623000 | 6/1937 |
| DE | 3541532 | 5/1986 |
| DE | 3923241 | 1/1991 |
| DE | 4300060 | 7/1994 |
| DE | 4300595 | 7/1994 |
| DE | 4323295 | 2/1995 |
| DE | 19740338 A1 | 3/1999 |
| DE | 19842778 A1 | 3/2000 |
| DE | 102004034293 A1 | 2/2006 |
| EP | 0132482 | 2/1985 |
| EP | 0318170 | 5/1989 |
| EP | 0466362 | 1/1992 |
| EP | 0507689 | 10/1992 |
| EP | 0587085 | 3/1994 |
| EP | 0743149 | 11/1996 |
| EP | 0997695 | 5/2000 |
| EP | 1004856 A2 | 5/2000 |
| EP | 1288600 | 3/2003 |
| EP | 1306635 A1 | 5/2003 |
| FR | 802618 | 9/1936 |
| FR | 2109840 | 5/1972 |
| FR | 2235775 | 1/1975 |
| FR | 2517087 | 5/1983 |
| FR | 2695988 | 3/1994 |
| GB | 479090 | 1/1938 |
| GB | 671085 | 4/1952 |
| GB | 849613 | 9/1960 |
| GB | 2081687 | 2/1982 |
| JP | 58133308 A | 8/1983 |
| JP | 58155423 A | 9/1983 |
| JP | 59082936 | 5/1984 |
| JP | 59187081 A | 10/1984 |
| JP | 59190623 A | 10/1984 |
| JP | 59204731 A | 11/1984 |
| JP | 62083622 A | 4/1987 |
| JP | 01286806 | 6/1987 |
| JP | 01235604 | 9/1989 |
| JP | 02077619 A | 3/1990 |
| JP | 02293501 A | 12/1990 |
| JP | 03020619 A | 1/1991 |
| JP | 03172716 A | 7/1991 |
| JP | 4201522 | 7/1992 |
| JP | 04278423 A | 10/1992 |
| JP | 04320946 A | 11/1992 |
| JP | 05142006 A | 6/1993 |
| JP | 06080015 A | 3/1994 |
| JP | 6114834 | 4/1994 |
| JP | 10310210 | 11/1998 |
| JP | 11064059 A | 3/1999 |
| JP | 2000-229331 A | 8/2000 |
| JP | 2000257809 A | 9/2000 |
| JP | 2002174541 A | 6/2002 |
| JP | 2012-131118 | 7/2012 |
| WO | WO 1999/015324 | 4/1999 |
| WO | WO 1999/037964 | 7/1999 |
| WO | WO 2001/49471 | 7/2001 |
| WO | WO 2006/002124 A1 | 1/2006 |
| WO | WO 2007/116022 A2 | 10/2007 |

OTHER PUBLICATIONS

Two-sided color brochure entitled "NovaDrier N Series Dryer" published by Novatec Inc., undated.
International Search Report for PCT/US98/19464 (WO 99/15324).
International Search Report for PCT/US02/19294.
Two page two-sided color brochure entitled "LPD Series Dryers: New Directions in drying technology" of Maguire Products, Inc., Jun. 6, 2000.
One page two-sided color brochure entitled "Drying Systems: WGR Gas Dryer Retrofit" of AEC Whitlock, 1997.
Two page two-sided color brochure entitled "Drying Systems: Mass Flow.TM. Series Drying Hoppers" of AEC Whitlock, 1998.
Four page color brochure entitled "Speedryer Thermodynamic Hopper Dryer" of Canam Manufactured Products Inc., Dec. 10, 2001.
Two page two-sided color brochure entitled "WDMR Series Compact Dryers" of AEC Whitlock, 1998.
Two page two-sided color reprint entitled "10 most frequently asked questions about Dryers" by Joseph Dziediz, AEC/Whitlock, from Plastics Technology, Jan. 1998.
Two page two-sided color brochure entitled "Drying Systems: WD Series High Capacity Dehumidifying Dryers" of AEC Whitlock, 1997.
Three page two-sided color brochure entitled "Portable Drying and Conveying Systems: Nomad.TM. Series Portable Dryers", AEC Whitlock, 1998.
Two page two-sided color brochure entitled "Drying Systems: WD Series Dehumidifying Dryers" of AEC Whitlock, 1997.
Five page two-sided color brochure entitled "AEC Auxiliaries as Primary", AEC, Inc., 1999.
Two page two-sided color brochure entitled "LPD Vacuum Dryers" of Maguire Products, Inc. Jun. 6, 2000.
19 page document entitled "Model MLS—Clear Vu Eight Component Vacuum Loading System: Operation Manual" of Maguire Products, Inc. dated May 4, 1999.
One page two-sided color brochure entitled "Maguire Clear-Vu.TM. Loading System" of Maguire Products, Inc., dated Nov. 12, 1996, Charlotte, NC.
One page color advertisement entitled "This little vacuum dryer can do in 40 minutes what it takes your desiccant dryer to do in 4 hours.", Plastic News dated Nov. 19, 2001.
One page color article entitled "Dryer Competition Heats Up With New Designs", Modern Plastics, Jul. 2001, p. 68.
One page advertisement of Frigomeccanica Industriale, Modern Plastics, Jul. 2001, p. 70.
16 page Low Pressure Dryer Technical Information Specifications Features of Maguire Products, Inc. dated Nov. 29, 2000.
One page article entitled "New Dryer Technologies at NPE Aren't Just Hot Air", Plastics Technology, Aug. 2000, p. 19.
One page article entitled "Tech Preview", Automatic Plastics, Aug. 2000, p. 66.
One page article entitled "Maguire expands Low Pressure Dryer commercialization" from www.specialchem.com dated Mar. 30, 2001.
One page article entitled "Smaller Resin Dryer", Plastics Engineering, Aug. 2001, p. 28.
Five page brochure entitled LPD.TM. Series Dryers of Maguire Products, Inc. dated Jan. 29, 2001.
Two page press released entitled "Maguire® LPD™ 30, Smaller Model of Breakthrough Resin Dryer, Will Make World Debut at K 2001 Show" of Maguire Products, Inc. dated Jun. 29, 2001.
Three page press release entitled "In Commercial Use by Wide Range of Plastic Processors, Maguire.RTM. LPD.TM. Resin Dryer Yields Big Savings in Energy Costs" of Maguire Products, Inc, dated May 14, 2001.
Two page press release entitled "Maguire Obtains Patent on Fundamentally New Resin Dryer and Steps Up Program for Worldwide Commercialization" of Maguire Products, Inc. dated Dec. 18, 2000.
Six page press release entitled "Fast, Low-Cost Process Transforms Resin Drying, Promising Dramatic Advance in Industry Productivity and Quality" of Maguire Products, Inc. dated Jun. 20, 2000.
Two page press release entitled "New-Concept Resin Dryer Enables

(56) References Cited

OTHER PUBLICATIONS

Custom Molder to Eliminate Reject Parts—and Once More Enjoy Sunday Evenings" of Maguire Products, Inc. dated Jun. 20, 2000.
One page color article entitled "Maguire LPD unit nets positive marks", Plastic News, Oct. 3, 2001, p. 3.
International Search Report for related application No. PCT/US2005/021851.
Five page Written Opinion of the International Searching Authority dated Sep. 29, 2005 in connection with International Patent Application No. PCT/US2005/021851.
Eight page European Search Report dated Sep. 23, 2005 in connection with European Patent Application No. EP05076911.
Maguire Products' in Brazilian Plastics—World Plastic News, "Maguire introduces new vacuum resin dryer based on gravity flow", Dated Mar. 22, 2013., "Expo Plast", 8th Fair of Suppliers for the Plastics Processing Industry. Aug. 27-30, 2013. CENTRO.
Sheet of 2 photographs of Mould-Tek gravimetric blender, circa 1993.
Sheet of 2 photographs of Motan gravimetric blender and feeding system with Maguire Products, Inc. controls, circa 1993.
Sheet of 3 photographs of UNA-DYN gravimetric blender, circa 1993.
Sheet of 2 photographs of Maguire Producs, Inc. gravimetric blender with Conair hoppers and feeding system, circa 1993.
Sheet of 1 photograph of Hydracolor gravimetric blender, circa 1993.
Advertisement entitled "Machinery and Systems for Extrusion is Our Only Business" Process Control Corporation, circa 1993.
Advertisement entitled "Weigh Blender Delivers Unmatched Accuracy" by Universal Dynamics, Inc., circa 1993.
Advertisement entitled "A Full Line-up of Blender Solutions . . . Priced Right" by HydReclaim, circla 1993.
Advertisement entitled "New From HydReclaim—Now Processors Can Economically Achieve Continuous Gravimetric Blending" by HydReclaim, circa 1993.
Article entitled "Control Loading Systems" from Plastics Technology, Oct. 1995, p. 41.
Advertisement "Introducing our 400 VME-II Gravimetric Blender" by HydReclaim Corporation, circa 1993.
Four page brochure entitled "Gravimix Better Quality through Research", circa 1993.
Four page brochure entitled "Conomix Plus Volumetric Blender" dated Aug. 1993.
Four page brochure entitled "Conair Franklin Autocolor Y Mezclador" dated Mar. 1995.
Two-sided flyer entitled "GB 140 Series Compact Auto Weigh Blender" published by Conair Franklin in the United States, Jun. 1994.
Six page brochure entitled "Graviblend Precise Continuous Weigh Blenders" published by Ktron Vertech, Jun. 1991, United States.
Six page brochure entitled "Piovan Gravimetric Blenders MDW" published by Piovan Sri, Oct. 1993, Venezia, Italy.
One page flyer entitled "Gravimix, The New Gravimetric Blending Generation" published by Ferlin, De demsvaard, Holland, circa 1993.
Four page brochure entitled "When you Weigh it All Up . . . " published by Ferlin Trading, Holland, circa 1993.
Thirty-two page catalog entitled "Maguire Color Blending Equipment" published by Maguire Products, Inc., 1993, United States.
Two page brochure entitled "Mould-Tek Bulk Handling Systems" published by Mould-Tek Industries, Inc. in Canada, circa 1993.
Brochure entitled "Plastic Molders and Extruders" published by Maguire Products, Inc., 1995.
Forty-four page two-sided color brochure including cover and back pages entitled "Maguire: Auxiliary equipment for the plastics industry" Maguire Products, Inc., Oct. 2000.
Two-sided color brochure entitled "Convey, Blend, Dry" published by Novatec, Inc., undated.
International Search Report for related application No. PCT/US2015/028472.
Written Opinion of the International Searching Authority dated Jul. 15, 2015 for International Patent Application No. PCT/US2015/028472.
European Extended Search Report and Written Opinion dated Dec. 19, 2017 for European Patent Application No. 15785821.8; Publication No. 3137831.

\* cited by examiner

METHOD AND APPARATUS FOR POLYMER DRYING USING INERT GAS

CROSS REFERENCE TO RELATED PATENT APPLICATIONS

This patent application is a 35 USC 120 continuation of U.S. Ser. No. 16/373,987 filed 3 Apr. 2019, published 10 Oct. 2019 as United States patent publication US-2019/0308344 A1, and entitled "Method and Apparatus for Polymer Drying using Inert Gas," which claimed the benefit of the priority of U.S. provisional patent application Ser. No. 62/652,612, filed 4 Apr. 2018. This patent application claims the priority of the '987 application under 35 USC 120 and claims the priority of the '612 application under 35 USC 120 through the '987 application.

INCORPORATION BY REFERENCE

This patent application incorporates by reference the disclosure of U.S. Pat. No. 6,584,701 issued 1 Jul. 2003.

STATEMENT REGARDING FEDERALLY SPONSORED RESEARCH OR DEVELOPMENT

Not applicable—this invention was conceived and developed entirely using private source funding; this patent application is being filed and paid for entirely by private source funding.

BACKGROUND OF THE INVENTION

This invention relates to apparatus and methods for drying solid granular material. The invention is more particularly concerned with apparatus and methods for reducing the moisture content of solid particulate of pelletized material, specifically granular resin material, prior to molding or extrusion thereof.

DESCRIPTION OF THE PRIOR ART

Many conventional systems for drying particulate materials, especially granular resin material, rely on desiccants to remove moisture from a stream of drying air directed at the granular resin material. The desiccant, which is typically a molecular-sieve type material such as zeolite, captures moisture from the drying air stream to produce very low dew point air, which is in turn directed at the granular resin material, which is typically in a hopper, to dry the granular resin material to a desired moisture level. In a typical system, the desiccant is situated in a unit that is downstream from the hopper and is in a closed loop; the dehumidified air from the desiccant unit is recirculated around the loop and through the granular material hopper by a blower. A heater situated between the desiccant unit and the granular material hopper heats the low dew point air to a desired drying temperature for supply to the hopper.

The recommended dew point of air for drying granular resin material is ordinarily below 0° F. and typically in a range of about −20° F. to about −50° F., or lower. Desiccant type drying systems can readily provide such low dew point air.

Notwithstanding their wide use, desiccant type drying systems have significant drawbacks. These arise primarily from the fact that desiccant materials must be regenerated periodically in order to maintain their drying effectiveness. Desiccants dehumidify by adsorption. When used over a period of time, the desiccant material becomes loaded with water and loses its effectiveness as a drying media. To restore its effectiveness, the desiccant material is regenerated from time to time, usually by flowing a heated air stream through the desiccant unit to drive off the adsorbed moisture. This requires the desiccant unit to be taken off-line, interrupting the granular resin material drying process. Alternatively, the drying system may include a second desiccant unit which is used alternately with the first desiccant unit, or which is operated such that its on-line time overlaps the regeneration cycle of the first unit.

In granular resin drying systems using a single desiccant unit, down time associated with desiccant regeneration results in reduced granular resin material throughput. Systems employing multiple desiccant units can avoid this problem, but they are more expensive due to the need to provide additional desiccant units and correspondingly more complex systems controls.

Many familiar and widely-used polymer materials including nylons, polybutylene terephthalate, polylactic acid polymers, and thermoplastic polyurethane degrade substantially when they are exposed to heat or are heated in the presence of oxygen. This is an ongoing problem in that nylon, polybutylene terephthalate, polylactic acid polymers, and thermoplastic polyurethane are some of the most widely used plastic polymer materials in the world. Their property of degrading when exposed to oxygen at high temperatures, which high temperatures are normally necessary to dry these polymers so that they may be processed by molding or extrusion into finished articles, presents continuing problems for molders and extruders.

Specifically, due to the degradation of these polymers when heated in the presence of air, lower temperatures for drying the polymers must be used in order to avoid polymer degradation. Use of lower temperatures slows the drying process, thereby requiring additional time for drying the polymer before the polymers can be processed into finished articles. With the continuing need for efficiency in the plastics processing industry, the extended drying time at lower temperatures for these polymers is a continuing problem and issue for the processors. The degradation in performance experienced by these polymers when heated to relatively high drying temperatures in the presence of oxygen include reduction in strength, loss of ductility, changes in color, changes in viscosity of the polymer when it is extruded or molded, changes in the chemical resistance of the polymer, reduced stiffness, and reduced stability of the polymer.

SUMMARY OF THE INVENTION

This invention addresses the problem of degradation of polymers such as nylon, polybutylene terephthalate, polylactic acid polymers, and thermoplastic polyurethane by providing a method and apparatus for drying such polymers in the absence of air or oxygen by producing substantially oxygen-free drying gas in the form of nitrogen or other inert gases and thereafter drying the polymer in a nitrogen or other inert gas atmosphere. This use of nitrogen or another inert gas as the atmosphere surrounding the polymer for the drying process allows higher drying temperatures than known heretofore, thereby reducing the time that the polymer is exposed to heat, and thereby minimizing degradation of the polymer, resulting in finished products with improved properties of strength, ductility, stiffness, color stability, and structural stability.

In one of its aspects this invention embraces apparatus producing an inert gas such as argon, nitrogen, or carbon-dioxide using a membrane. Suitable membranes for use of practicing this invention are produced by Air Products Corporation, Dow-DuPont Corporation, Parker, Henkle, Generan, and SMC.

In its apparatus aspect the invention is particularly adapted for drying polymer resins, providing faster drying of granular polymers than has been known heretofore.

In addition to granular polymers, the invention may be used to dry regrind flakes, reprocessed regrind polymer resin, powders of polymer resin, and the like. Drying with the inert gas in accordance with the preferred aspect of the invention preserves the strength, ductility, color, opaqueness, viscosity, chemical resistance, stiffness, and stability of the polymer once it has been fabricated into a finished or semi-finished product; all of these desirable properties and characteristics can be compromised if the polymer resin is dried in the presence of air or pure oxygen.

In one of its apparatus aspects, this invention provides apparatus for drying polymer resin prior to molding or extrusion where the apparatus includes a first conduit adapted for connection at one end thereof to a supply of compressed air. The apparatus further includes a first heater for heating compressed air supplied to the heater through the first conduit. The apparatus further includes a housing which includes a membrane receiving heated air from the heater. The membrane has apertures therethrough of size allowing passage of gas molecules of oxygen size or smaller. The housing further includes internal structure allowing release to ambient of gas molecules that pass through the membrane apertures while funneling gas molecules too large for passage through the apertures to a heating gas outlet. The apparatus further includes, in this embodiment, a second heater for heating gas received from the heating gas outlet of the housing. The apparatus yet further includes, in this embodiment, a resin drying hopper for holding polymer resin to be dried where the resin drying hopper receives gas for drying the resin from the second heater.

In another one of its apparatus aspects, the invention embraces apparatus for drying polymer resin prior to molding or extrusion where the apparatus includes a first conduit adapted for connection at one end thereof to a supply of compressed air. The first conduit divides the received supply of compressed air into two portions. The apparatus further includes in this embodiment a first heater for heating a first portion of the compressed air supplied to the first heater through the first conduit. The apparatus yet further includes a housing having a membrane receiving heated first portion air from the first heater. The membrane has apertures therethrough of size allowing passage of first portion gas molecules of oxygen size and smaller. The housing has internal structure allowing release to ambient of gas molecules pasting through the apertures while funneling first portion gas molecules too large for passage through the apertures to a heating gas outlet. A second heater is supplied which serves to heat first portion gas molecules received from the heating gas outlet of the housing. A drying hopper for holding polymer resin to be dried is part of the apparatus. The resin drying hopper receives heating first portion gas molecules for drying the resin from the second heater. The apparatus further includes an ejector receiving the second portion of the compressed air. A takeoff conduit connects an upper portion of the drying hopper with the ejector for flow of heating gas from the hopper to the ejector. A third heater receives a mixture of heating gas and air from the ejector. A conduit supplies the heated mixture of heating gas and air from the third heater to the drying hopper.

In yet another one of its apparatus aspects, the invention provides apparatus for drying polymer resin prior to molding or extrusion where the apparatus includes a first conduit adapted for connection at one end thereof to a supply of compressed air. The apparatus further includes a first heater for heating the compressed air supplied thereto through the first conduit. A housing including a membrane receives heated first portion air from the first heater. The membrane has apertures therethrough of size allowing passage of gas molecules of oxygen size or smaller. The housing has internal structure allowing release to ambient of gas molecules passing through the apertures while funneling gas molecules too large for passage through the apertures to a heating gas outlet. A conduit receives the larger-size gas molecules from the heating gas outlet of the housing and divides the received gas into two portions. A second heater is supplied for heating first portion gas molecules that are received from the conduit connected to the heating gas outlet of the housing. A drying hopper is supplied for holding polymer resin to be dried. The resin drying hopper receives first portion gas molecules for drying the resin from the second heater. An ejector receives the second portion of the larger size gas molecules from the conduit connected to the heating gas outlet of the housing. A takeoff conduit connects an upper portion of the drying hopper with the ejector for recycle flow of heating gas from the hopper to the ejector. A third heater receives a mixture of recycled heating gas and a second portion of larger-size gas molecules from the ejector. The apparatus yet further includes a conduit supplying the heating gas from the third heater to the drying hopper.

In one of its method aspects, this invention provides a method for drying granular resin material in a chamber by presenting air to a membrane separating oxygen-size and smaller molecules out to provide a stream of drying gas molecules that are at least nitrogen-size, heating the stream of drying gas molecules of at least nitrogen-size, and introducing the stream of heated drying gas into a chamber for upward flow through the granular resin material, which is preferably flowing downwardly through the chamber.

In another one of its aspects, this invention provides a method for drying granular resin material in a chamber where the method includes presenting a first portion of air to a membrane separating oxygen-size and smaller molecules out to provide a stream of drying gas molecules of at least nitrogen-size, heating the stream of drying gas, introducing the stream of drying gas into a chamber for upward drying gas flow through granular resin material, which is preferably flowing downwardly through the chamber, drawing off a portion of the drying gas flow from an upper portion of the chamber after upward passage of the drying gas through the granular resin material within the chamber, presenting a remaining portion of the air to an ejector to power the drawn-off portion of drying gas for reintroduction into the chamber, and introducing the drawn-off portion of drying gas into the chamber for flow through granular resin material that is preferably flowing downwardly through the chamber.

In yet another one of its aspects, this invention provides a method for drying granular resin material in a chamber where the method includes presenting air to a membrane separating oxygen-size and smaller molecules out to provide a stream of drying gas molecules of at least nitrogen-size, heating a stream of the drying gas, introducing a first portion of the stream of drying gas into a chamber for preferable upward flow of drying gas through granular resin material, which is preferably flowing downwardly through the chamber, drawing off a portion of the drying gas flow from an upper portion of the chamber after preferable upward passage of the drying gas through the granular resin material preferably flowing downwardly through the chamber, presenting a remaining portion of the drying gas to an ejector to power the drawn-off portion of the drying gas for reintroduction into the chamber, and introducing the drawn-off portion of drying gas into the chamber to flow through granular resin material preferably flowing downwardly through the chamber.

In another one of its aspects the inventive apparatus is used with nitrogen or another inert gas for drying, in either a single pass or multiple pass drying system, which drying gas can be introduced at either a single point or at multiple points in a drying hopper. The invention allows for one or more temperatures to be used in systems, with inert gas such as nitrogen being introduced at one or more points in the drying hopper. When inert gas such as nitrogen is introduced into the drying hopper at multiple points, this allows a single or multiple drying temperatures to be used.

In a preferred embodiment, the dryer employs a membrane that substantially maintains its gas separation capacity under continuous use, without the need for regeneration. For use in drying particulate materials, specifically granular plastic resin, the dryer may preferably use a stream of inert gas, preferably either nitrogen or argon produced using gas separation membrane, with the gas having a low dew point.

The invention most preferably uses an inert gas, preferably nitrogen or argon, produced using a membrane or other device, to inhibit the degradation of the granular resin material being dried, which degradation is due to oxidation or elevated temperatures.

The invention preferably uses air or a non-inert gas to produce the required nitrogen, argon, or other inert gas.

The invention allows the use of higher drying temperatures, provides faster drying of the granular resin material, and maintains desirable properties of the granular resin material that would otherwise be diminished due to presence of oxygen.

The invention can be used in either a single pass or multiple pass system with nitrogen or argon or another inert gas introduced at a single point or at multiple points in the drying process.

The invention allows for one or more temperatures to be maintained in systems using nitrogen or argon with varying temperatures at one or more points in the drying process.

The following Description of the Invention is merely exemplary in nature and is not intended to limit the described invention or uses of the described embodiments. As used herein, the words "exemplary" and "illustrative" mean "serving as an example, instance, or for illustration." Any implementation or embodiment or abstract disclosed herein as being "exemplary" or "illustrative" is not necessarily to be construed as preferred or advantageous over other implementations, aspects, or embodiments. All of the implementations or embodiments described in the following Description of the Invention are exemplary implementations and embodiments that are provided to enable persons of skill in the art to make and to use the implementations and embodiments disclosed below, or otherwise to practice the invention, and are not intended to limit the scope of the invention, which is defined by the claims.

Furthermore, by this disclosure, there is no intention on the part of the Applicant to be bound by any express or implied theory presented in the preceding materials, including but not limited to the Background of the Invention, the Description of the Prior Art, the Summary of the Invention, or in the following Description of the Invention. It is to be understood that the specific implementations, devices, processes, aspects, and the like illustrated in the attached drawings and described anywhere in this application are simply exemplary embodiments of the inventive concepts defined by the claims. Accordingly, specific dimensions and other physical characteristics relating to the embodiments disclosed herein are not to be considered as limiting as respecting the invention, unless the claims or the Description of the Invention expressly state otherwise.

DESCRIPTION OF THE INVENTION

Figure 2:
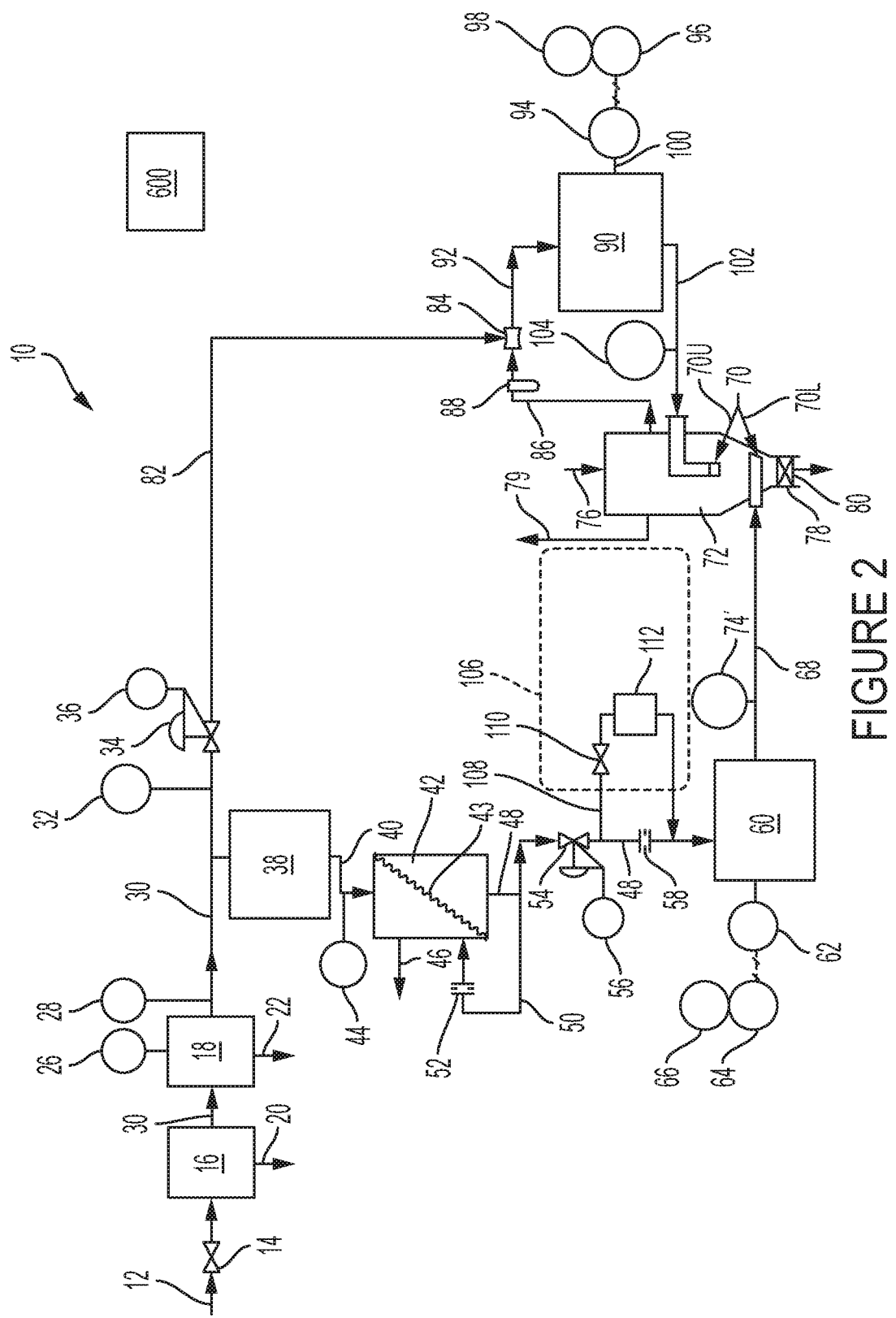
FIG. 2 is a flow diagram illustrating a dual flow, single inlet embodiment of the invention in which nitrogen or another inert gas is introduced at a single, lower inlet point, with recirculation in an upper loop recirculating some of the nitrogen or another inert gas with air.

Referring to the drawings in general and specifically to FIG. 2, a granular material drying apparatus in accordance with the invention is illustrated schematically, is designated generally 10, and has a compressed air inlet 12 leading to an inlet shutoff valve 14. Downstream from the inlet shutoff valve 14 is a primary filter 16, followed by a secondary filter 18. An input line 30 is provided for passage of compressed air from inlet shutoff valve 14 to primary filter 16, from primary filter 16 to secondary filter 18, and from secondary filter 18 on into additional components of granular material drying apparatus 10.

Primary filter 16 has associated therewith a first condensate drain 20 for drain of condensate filtered out of the incoming air stream by primary filter 16. Similarly, secondary filter 18 has a second condensate drain 22 associated therewith for drainage of condensate filtered out of the incoming air stream by secondary filter 18. Primary filter 16 and secondary filter 18 filter particulates and further preferably include drying apparatus, preferably in the form of evaporators, to remove excess moisture from incoming compressed air supplied by air inlet 12.

A differential pressure indicator 26 is provided and connected to secondary filter 18 to provide a reading of the differential pressure across secondary filter 18 as the incoming compressed air traveling through an inlet line 30, passes through secondary filter 18 and is filtered, with particulates and moisture being removed therefrom. Immediately downstream of secondary filter 18 is a pressure indicator 28 to indicate pressure of air flowing within input line 30 downstream of secondary filter 18, but upstream of the electric heater and membrane described below. Differential pressure indicator 26 and pressure indicator 28 are connected or otherwise communicate with a microprocessor 600 for control and monitoring of the operation of the apparatus illustrated in FIG. 2.

Still referring to FIG. 2, a "T" connection, not numbered in the drawings, is provided to split the flow of incoming compressed air in input line 30. One leg of the "T" leads to a preferably electric heater 38. Immediately adjacent to the unnumbered "T" connection, a low pressure switch 32 is provided to indicate pressure of the air flowing through input line 30 immediately prior to reaching heater 38. Low pressure switch 32 is connected to microprocessor 600.

The remaining leg of the unnumbered "T" connection leads initially to an inlet line control valve 34, which has a pressure indicator 36 associated therewith. Control valve 34 is controlled by microprocessor 600 and pressure indicator 36 is also connected to microprocessor 600 for receipt of pressure data by microprocessor 600.

Line 40 leads from heater 38 to a housing 42; a thermocouple is provided in line 40 to sense temperature of air leaving electric heater 38 and entering housing 42. The thermocouple is numbered 44 in the drawing. Heater 38 is a variable heater in order to control the temperature of air leaving heater 40 and introduced into housing 42. Temperature control of housing 42 is important in that the performance of gas separation membrane 43 is dependent on temperature. Control of heater 38 and the amount of heat output by heater 38 is effectuated by microprocessor 600. Heater 38 may be gas fired or may be electrically powered.

Heat output from heater 38 is carefully controlled by microprocessor 600 so as to maintain the proper environmental temperature for membrane 43 in housing 42. Housing 42 is equipped with an oxygen vent, indicated as 46 in the drawing. Inert gas, having been separated out from the air coming into housing 42, exits housing 42 through a discharge line 48 at the bottom of housing 42. A feedback line 50 leads from discharge line 48 through a pressure regulator 52 back into housing 42. Feedback line 50 together with pressure regulator 52 assures that an adequate level of pressure is provided within housing 42, namely pressure that is neither too high nor too low, and especially that the feedback gas provided by feedback line 50 is not at an excessive pressure for continued successful operation of housing 42.

Housing discharge line 48 proceeds to a control valve 54, which has a pressure indicator 56 associated therewith; control valve 54 and pressure indicator 56 are both connected to a microprocessor 600 with control valve 54 being controlled desirably by microprocessor 600. Downstream of control valve 54 housing discharge line 48 continues and encounters a pressure regulator 58 before reaching electric heater supply 60. Associated with heater 60 are a thermocouple 62, a temperature controller 64, and a high temperature switch 66, all as illustrated in FIG. 2. Thermocouple 62 and temperature controller 64 are connected to heater 60 by a line illustrated in FIG. 2, which has not been numbered to enhance drawing clarity. Thermocouple 62 and temperature controller 64 are connected to microprocessor 600, which controls temperature controller 64, which in turn controls operation of heater 60.

A gas feed line 68 receives heated inert gas exiting heater 60 and conveys that heated inert gas to diffuser 70, which is a portion of a granular material drying hopper 72. Diffuser 70 preferably has upper and lower portions denoted 70U and 70L in FIG. 2. Gas supplied through gas feed line 68 goes to lower portion 70L of diffuser 70. A high temperature switch is connected to gas feed line 68 in position between heater 60 and granular material drying hopper 72; the high temperature switch connected to gas feed line 68 is denoted 74 in the drawing. High temperature switch 74 is connected to and controlled by microprocessor 600.

Drying hopper 72 has a material inlet designated 76 at the upper extremity thereof. Drying hopper 72 further includes an outlet valve 78, located in a discharge orifice portion of drying hopper 72, where the discharge orifice is designated 80 in the drawing.

Leading from inlet line control valve 34 is a booster line 82, which may be optionally used to provide additional gas to provide additional drying capacity for drying hopper 72. Booster line 82, when inlet line control valve 34 is open, provides a source of high pressure air to an air powered ejector 84. Also connected to air powered ejector 84 is an outlet line 86 coming from the upper portion of granular material drying hopper 72 and preferably carrying stillwarm substantially inert heating gas to air powered ejector 84. Interposed in outlet line 86 between drying hopper 72 and air powered ejector 84 is a filter 88.

Air ejector 84, being powered by air supplied through booster line 82, effectively drives drying gas received from outlet line 86 and air from line 82 into a heater 90, in which that warm drying gas blend can be further heated to raise its temperature higher and thereby lower its dew point for re-introduction into granular material drying hopper 72. The warm drying gas to be reheated and recirculated into hopper 72 travels from ejector 84 to heater 90 via a supply line 92.

Associated with and connected to heater 90 are a pair of thermocouples, where the pair has been denoted 94 in the drawing, a temperature controller 96, and a high temperature switch 98, both of which are connected to microprocessor 600, with temperature controller 96 being regulated and controlled by microprocessor 600. The thermocouples and the temperature controller are connected to heater 90 by a line 100. The warm, reheated drying gas blend is supplied from heater 90 to hopper 72 by a secondary drying gas feed line 102. A high temperature sensing switch 104, connected to microprocessor 600, is mounted on secondary drying gas feed line 102 to provide indication of drying gas temperature being excessively high, in the event of a malfunction of heater 90 or other malfunction upstream of secondary gas feed line 102. The reheated drying gas supplied by secondary gas feed line 102 enters hopper 72 via an upper portion of diffuser 70, designated 70U, in FIG. 2.

An optional digital dew point monitor may be provided as a part of apparatus 10. The digital dew point monitor option is indicated by dotted line 106 and includes a line 108 for taking off a sample portion of heated drying gas passing downwardly through line 48. Takeoff line 108 supplies a sample of the heated drying gas through a valve 110 to a sensor 112, which senses the dew point of the heated drying gas and provides a digital output indicative of the same. Takeoff line 108, after passing supplying gas to valve 110 and digital dew point sensor 112, reconnects with line 48 downstream of pressure regulator 58.

Figure 4:
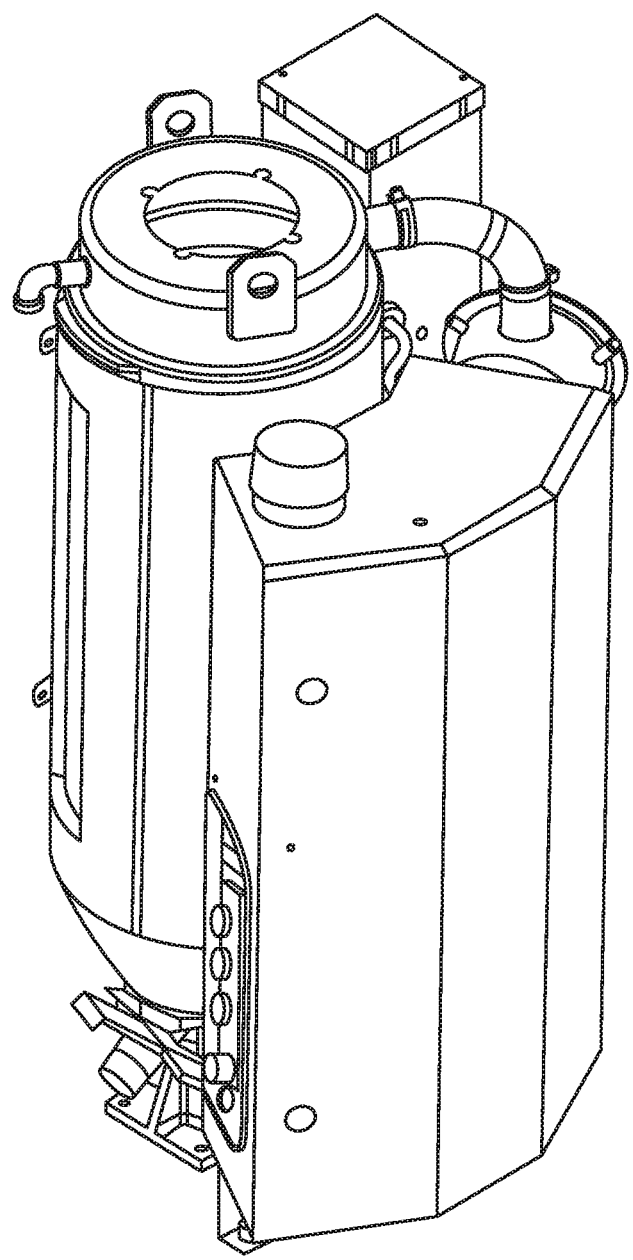
FIG. 4 is an isometric drawing of an implementation of the invention in compact form.
Figure 5:
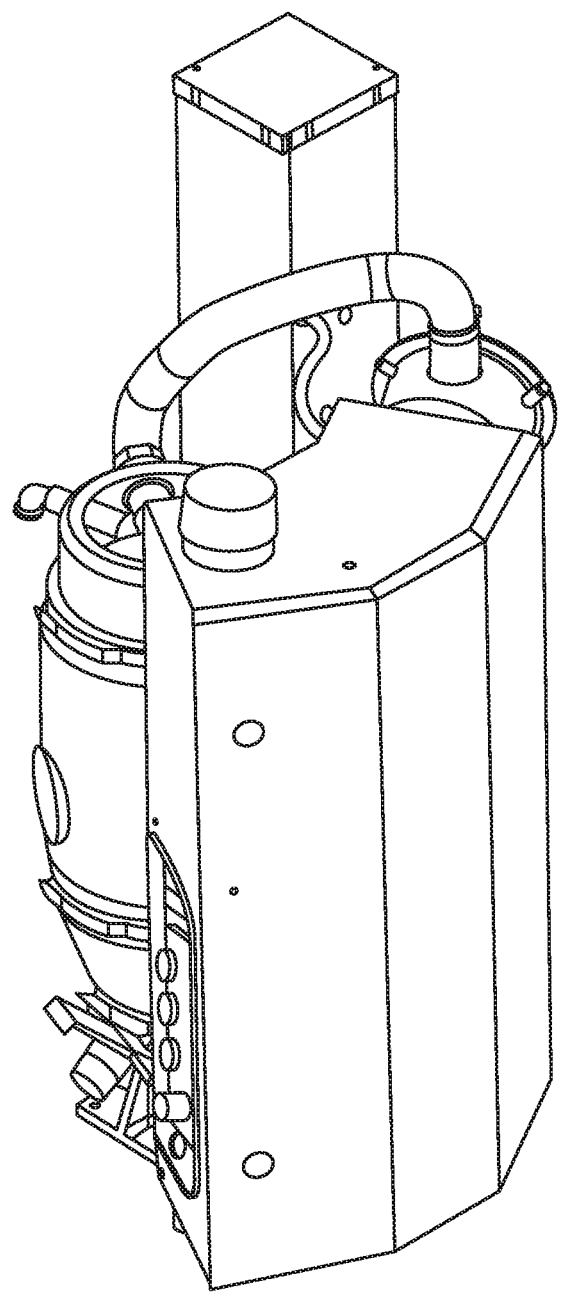
FIG. 5 is an isometric drawing of a second implementation of the invention in compact form.

A microprocessor 600 controls operation of the apparatus as illustrated in FIG. 2. Connection between the microprocessor and the various temperature and pressure control components, some of which are illustrated in FIG. 2, may be by hardwire, which is desirable when the invention is implemented in a highly-compact form such as illustrated in FIGS. 4 and 5, or may be by Bluetooth or even Internet wireless transmission where the invention is implemented in larger component form with the components spread out throughout a factory or other facility.

During operation of the apparatus illustrated in FIG. 2 and the method for drying granular resin material as practiced by the apparatus of FIG. 2, the incoming compressed air entering the system via air inlet 12 is divided into two streams by the unnumbered "T" in inlet line 30. One leg of the "T" provides one of the two streams of air to heater 38, which proceeds to heat one of the streams to a temperature prescribed for the gas separation membrane 43. The method further proceeds with the conduit presenting the heated gas stream to the membrane 43, which separates out oxygen size and smaller molecules to provide a stream of gas molecules of at least nitrogen size. That stream of gas molecules of at least nitrogen size is provided via discharge line 48 through control valve 56 and pressure regulator 58 to heater 60, which is referred to as a second heater. Heater 60 then proceeds by heating the stream of gas molecules of at least nitrogen size to a temperature selected to reduce dew point of the stream to a preselected level or at least into a preselected range. The heated stream of gas molecules is then introduced into drying chamber 72 for upward flow towards atmosphere through granular resin material in the chamber with the reduced dew point gas drying any granular resin material in drying chamber 72 by drawing moisture therefrom during contact with the granular resin material.

The method proceeds with drawing a portion of the reduced dew point gas out of drying chamber 72 via lines 86 through filter 88, with the draw being performed by ejector 84, where ejector 84 is powered by a stream of air conveyed thereto through inlet line control valve 34 and booster line 82. In ejector 84, a portion of reduced dew point gas drawn out of drying chamber 72 at a point between the introduction of drying gas into chamber 72 via line 68 and the gas venting to atmosphere via discharge line 79, is drawn by the ejector powered by the stream of air supplied by booster line 82. The method proceeds with combing at least a portion of the stream of air supplied by booster line 82 with the portion of reduced dew point gas drawn from the chamber by the action of ejector 84, with the reduced dew point gas passing from the chamber to ejector 84 through line 86. This combined flow of the remaining stream of air from booster line 82 and the drying gas from line 86 are heated to reduce the dew point of the combined flow. Finally, the combined flow is introduced into chamber 72 to join upward flow of drying gas through granular resin material in chamber 72 to atmosphere, thereby further drying the granular material in chamber 72 by drawing moisture therefrom during contact therewith.

Figure 1:
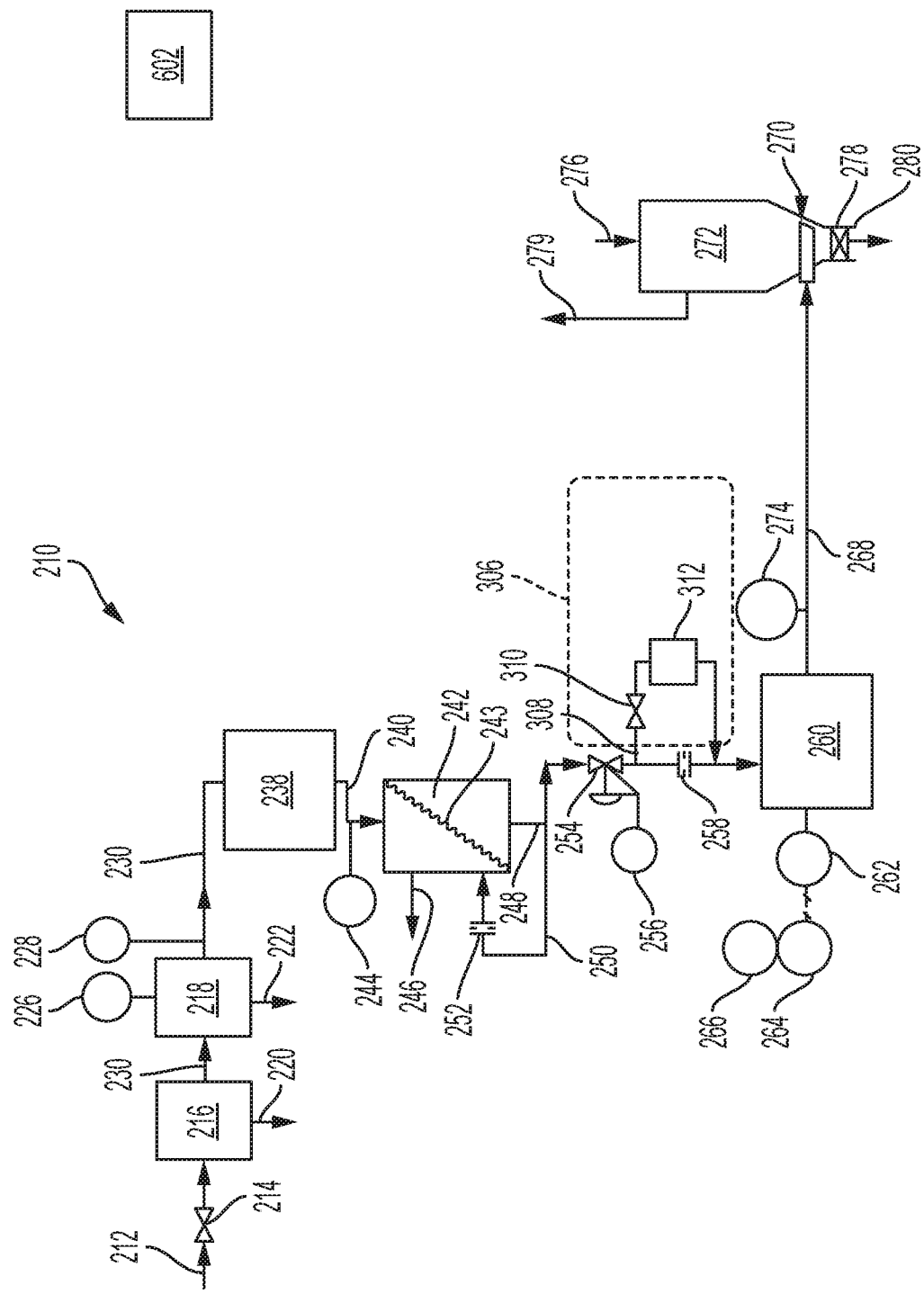
FIG. 1 is a flow diagram of the apparatus for the practice of the invention presenting a single flow, single inlet embodiment of the invention in which nitrogen or another inert gas is produced and introduced at a single point at the bottom of the hopper and exits the hopper at the top without recirculation.

Still referring to the drawings, and specifically to FIG. 1, another granular material drying apparatus in accordance with the invention is illustrated schematically, is designated generally 210, and has a compressed air inlet 212 leading to an inlet shutoff valve 214. Downstream from inlet shutoff valve 214 is a primary filter 216, followed by a secondary filter 218. An input line 230 is provided for passage of compressed air from inlet shutoff valve 214 to primary filter 216, from primary filter 216 to secondary filter 218, and from secondary filter 218 on into additional components of granular material drying apparatus 210. Primary filter 216 has associated therewith a first condensate drain 220 for drain of condensate filtered out of the incoming air stream by primary filter 216.

Similarly, secondary filter 218 has a second condensate drain 222 associated therewith for drainage of condensate filtered out of the incoming air stream by secondary filter 218. A differential pressure indicator 226 is provided and connected to secondary filter 218 to provide a reading of the differential pressure across filter 218 as the incoming compressed air traveling through an inlet line 230 passes through secondary filter 218 and is filtered, with particulates and moisture being removed therefrom. Immediately downstream of secondary filter 218 is a pressure indicator 228 to indicate pressure of air flowing within inlet line 230 downstream of secondary filter 218, but upstream of the electric heater and membrane described below.

Inlet line 230 connects to heater 238 for supply of filtered incoming air to heater 238. Line 240 leads from heater 238 to a housing 242; line 240 includes a thermocouple numbered 244 in FIG. 1. Housing 242 is equipped with an oxygen vent, indicated as 246 in FIG. 1.

Housing 242 has a gas separation membrane therewithin to separate oxygen and other gases having molecules smaller than oxygen from nitrogen and other gases having molecules larger than nitrogen. The nitrogen and other gases having large molecules, such as argon, are inert respecting granular resin material.

Inert gas, having been separated out from the air coming into housing 242 and dried within housing 242 exits housing 242 through a discharge line 248 at the bottom of housing 242. A feedback line 250 leads from discharge line 248 through a pressure regulator 252 back into housing 242. Feedback line 250 together with pressure regulator 252 assures that an adequate level of pressure is provided within housing 242, namely a pressure that is neither too high nor too low and especially so that the feedback gas provided by feedback line 250 is not at excessive pressure for continued successful operation of the membrane within housing 242. Housing discharge line 248 proceeds to a control valve 254, which has a pressure indicator 256 associated therewith. Downstream of control valve 254 housing discharge line 248 continues to a pressure regulator 258 before reaching a preferably electrically powered heater 260. Associated with heater 260 are a thermocouple 262, a temperature controller 264, and a high temperature switch 266, all as illustrated in FIG. 1. Thermocouple 262 and temperature controller 264 are preferably connected to heater 260 by electrical wiring illustrated in FIG. 1, which has not been numbered to enhance drawing clarity.

A gas feed line 268 receives heated inert gas exiting heater 260 and conveys that heated inert gas to a diffuser 270, which is located within and forms a portion of granular resin material drying hopper 272. A high temperature switch is connected to gas feed line 268 at a position between heater 260 and granular material drying hopper 272; the high temperature switch connected to gas feed line 268 is denoted 274 in FIG. 1. A vent to atmosphere from granular resin material drying hopper 272 is designated 279 in FIG. 1.

Drying hopper 272 has a granular resin material inlet designated 276 at the upper extremity thereof. Drying hopper 272 further includes an outlet valve 278, located in a discharge orifice portion of drying hopper 272, where the discharge orifice is designated 280 in the drawing.

An optional dew point monitor may be provided as a part of apparatus 210 illustrated in FIG. 1. The digital dew point monitor option is indicated by dotted line 306 and includes a line 308 for taking off a sample portion of heated drying gas passing downwardly through line 248. Takeoff line 308 supplies a sample of the heated drying gas through a valve 310 to a sensor 312, which senses the dew point of the heated drying gas and provides a digital output indicative of the same. Takeoff line 308, after passing supplying gas to valve 310 and digital dew point sensor 312, reconnects with line 248 downstream of pressure regulator 258.

A microprocessor 602 controls operation of the apparatus illustrated in FIG. 1 in accordance with the method aspects of the invention. Microprocessor 602 may be connected to the remaining components illustrated in FIG. 1 either by hardwire connection, when the invention is implemented in a compact form such as illustrated in FIGS. 4 and 5, or by wireless means such as Bluetooth or via the Internet, where the components of the invention are spread out in a factory environment. Connection of microprocessor 602 to the components illustrated in FIG. 1 has not been shown in the drawings to preserve the clarity of the drawings.

Microprocessor 602 is operatively connected to differential pressure indicator 226, pressure indicator 228, heater 238, pressure regulator 252, control valve 254, pressure indicator 256, pressure regulator 258, heater 260, temperature controller 264, high temperature switch 266, high temperature switch 274, and granular material outlet valve 278, all of which are illustrated in FIG. 1.

In the course of practice of the method of the invention by the apparatus illustrated in FIG. 1, the method for drying granular material commences by heating air to a temperature prescribed for the gas separation membrane where the heating is performed in heater 238 and the gas separation membrane 243 is within housing 242. The heated air is presented from heater 238 to membrane 243, which separates out oxygen size and smaller molecules to provide a stream of gas molecules of at least nitrogen size, where that stream is provided by an output from housing 242 in the form of discharge line 248. The stream of gas molecules of at least nitrogen size are heated to a temperature selected to reduce dew point of the stream where the heating is performed by a heater 260, sometimes referred to as a "second" heater in the claims, as contrasted to heater 238, sometimes referred to as a "first" heater in the claims. The heated stream of gas molecules, raised to a sufficiently high temperature within heater 260 to have a sufficiently low dew point, is introduced into granular material drying chamber 272 for upward flow to atmosphere through granular resin material residing in chamber 272, with the reduced dew point stream of gas drying the granular resin material by drawing moisture therefrom during contact therewith. The heated gas supplied via gas feed line 268 is typically at least 95% nitrogen by volume.

As respecting the apparatus claims, inlet line 230 is sometimes referred to as "a first conduit", which is adapted for connection at one end thereof to the supply of compressed air which desirably is air from the facility at which the apparatus is located. Heater 238 is referred to as a "first heater" for heating compressed air supplied thereto via the first conduit, namely conduit 230. Housing 242 includes a membrane such as membrane 243 having apertures therethrough of size allowing passage of gas molecules of oxygen size and smaller with housing 242 having internal structure allowing release to ambient of gas molecules passing through the apertures, with such release to ambient being through oxygen vent 246, illustrated in FIG. 1. Housing 242 funnels gas molecules too large for passage through the apertures to a heating gas outlet represented by discharge line 248 in FIG. 1. A second heater represented by heater 260 in FIG. 1 heats gas received from the heating gas outlet 248 of housing 242 to lower the dew point of that gas. The apparatus further includes a resin drying hopper represented by granular material drying hopper 272 for holding polymer resin to be dried within the resin drying hopper 272 receiving drying gas via gas feed line 268 from second heater 260.

Figure 3:
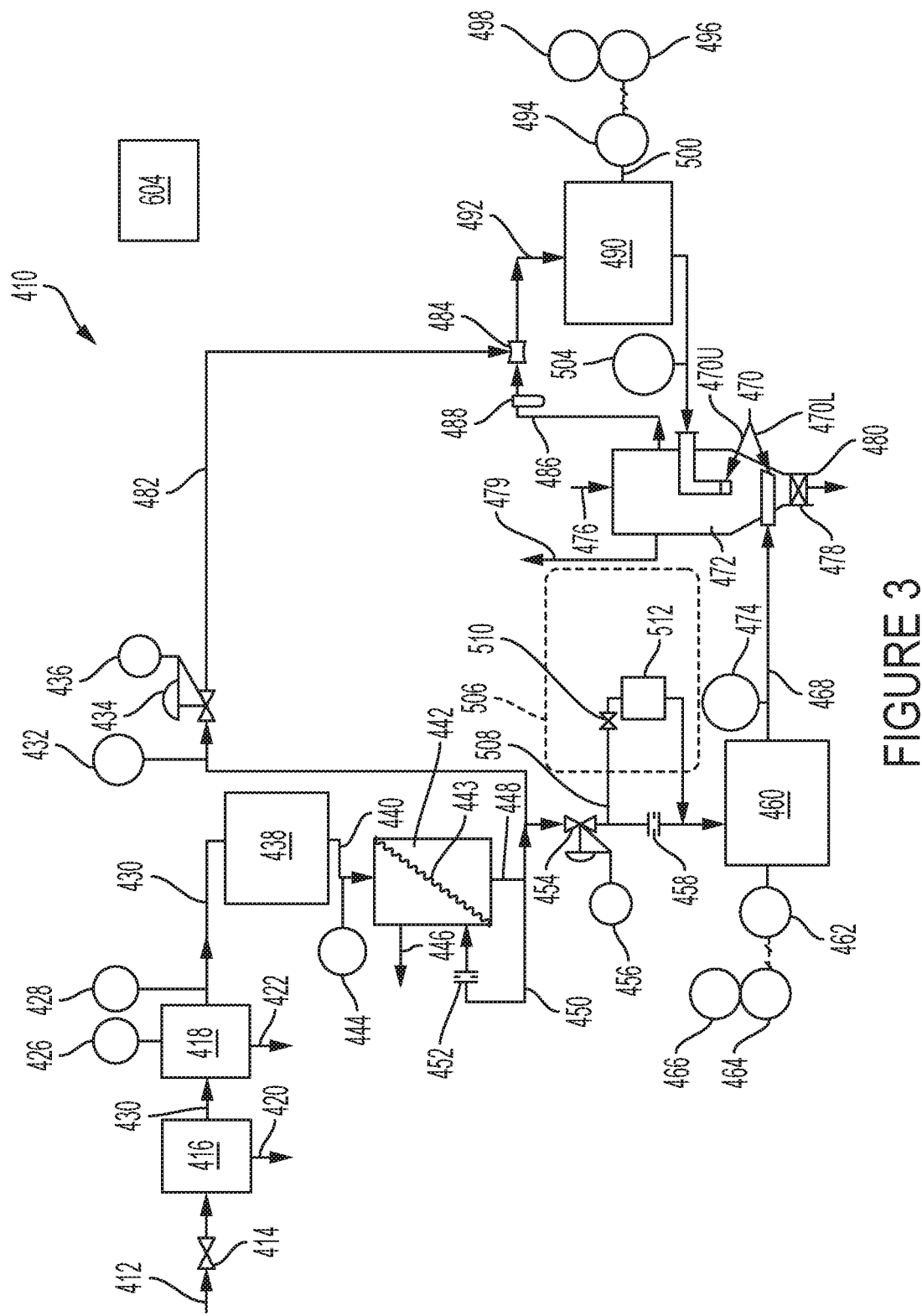
FIG. 3 is a flow diagram illustrating a dual flow, dual inlet embodiment of the invention in which nitrogen or another inert gas flows into the apparatus at the bottom point and also serves to power a venturi. In this embodiment of the invention less gas is introduced into the hopper, through the venturi, and a higher purity is maintained in the upper recirculation loop.

Referring further to the drawings, and specifically to FIG. 3, a third granular material drying apparatus in accordance with the invention is illustrated schematically, is designated generally 410, and has a compressed air inlet 412 leading to an inlet valve 414. Inlet valve 414 provides both a shutoff function and a pressure reducing metering control function with respect to input air supplied through inlet 412. Downstream from the inlet valve 414 is a primary filter 416, followed by a secondary filter 418. An input line 430 is provided for passage of compressed air from inlet shutoff valve 414 to primary filter 416, from primary filter 416 to secondary filter 418, and from secondary filter 418 on to additional components of granular material drying apparatus 410.

Primary filter 416 has associated therewith a first condensate drain 420 for drain of condensate filtered out of the incoming air stream by primary filter 416. Similarly, secondary filter 418 has a second condensate drain 422 associated therewith for drainage of condensate filtered out of the incoming air stream by secondary filter 418. A differential pressure indicator 426 is provided and connected to secondary filter 418 to provide a reading of differential pressure across filter 418 as the incoming air traveling through an inlet line 430 passes through secondary filter 418 and is filtered, with particles and moisture being removed therefrom. Immediately downstream of secondary filter 418 is a pressure indicator 428 to indicate pressure of air flowing within input line 430 downstream of secondary filter 418, but upstream of the electric heater and gas separation membrane described below.

Inlet line 430 connects with heater 438, providing air input to heater 438.

Line 440 leads from heater 438 to a membrane housing 442; a thermocouple is provided in line 440 to sense temperature of air leaving preferably electric heater 438 and entering housing 442. The thermocouple is numbered 444 in FIG. 3. Membrane housing 442 is equipped with an oxygen vent, indicated as 446 in the drawing. Inert gas is separated out from the air coming into housing 442 by a gas separation membrane depicted schematically and designated 443 in FIG. 3.

The inert gas exits housing 442 through a discharge line 448 at the bottom of housing 442. A feedback line 450 for the inert gas leads from discharge line 448 through a pressure regulator 452 back into housing 442. Feedback line 450 together with pressure regulator 452 assures that an adequate level of pressure is provided within housing 442, namely a pressure that is neither too high nor too low, and especially so that the feedback inert gas provided by feedback line 450 is not at an excessive pressure for membrane 443 and continued successful operation of the membrane within housing 442.

Membrane housing discharge line 448 proceeds to a control valve 454, which has a pressure indicator 456 associated therewith. Downstream of control valve 454, housing discharge line 448 continues and encounters a pressure regulator 458 before reaching heater 460, which is preferably electrically powered. Associated with heater 460 are a thermocouple 462, a temperature controller 464, and a high temperature switch 466, all as illustrated in FIG. 3. Thermocouple 462 and temperature controller 464 are connected to heater 460 by an electrical power and signal line illustrated in FIG. 3, which has not been numbered to enhance drawing clarity.

A gas feed line 468 receives heated inert gas exiting heater 460 and conveys that heated inert gas to diffuser 470, which is a portion of granular material drying hopper 472. Diffuser 470 preferably has upper and lower portions denoted 470U and 470L in the drawing. Gas supplied through gas feed line 468 goes to lower portion 470L of diffuser 470. A high temperature switch is connected to gas feed line 468 in position between heater 460 and granular material drying hopper 472; the high temperature switch connected to gas feed line 468 is denoted 474 in FIG. 3.

Drying hopper 472 has a granular resin material inlet designated 476 at the upper extremity thereof. Drying hopper 472 further includes an outlet valve 478 for the dried granular resin material located in a discharge orifice portion of drying hopper 472, where the discharge orifice is designated 480 in FIG. 3.

A "T", not numbered in the drawings, is positioned in discharge line 448 downstream of the location at which feedback line 450 takes off from discharge line 448 but prior to discharge line 448 reaching control valve 454. This unnumbered "T" has its remaining leg connected to and defining the start of inert drying gas supply line 482, which functions as a booster line for additional inert drying gas from granular material drying hopper 472, recycled through a heater and then reintroduced into granular material drying hopper 472, all as described below. After the unnumbered "T", inert drying gas booster line 482 reaches control valve 434. Associated with control valve 434 is a pressure indicator 436 as shown in FIG. 3. Also provided is a low pressure switch 432 immediately upstream of booster line control valve 434, as illustrated in FIG. 3. Downstream of booster line control valve 434, inert drying gas booster line 482 connects to an ejector 484.

Also connected to ejector 484 is an outlet line 486 coming from the upper portion of granular material drying hopper 472 and preferably carrying still-warm inert drying gas to ejector 484. Interposed in outlet line 486 between drying hopper 472 and ejector 484 is a filter 488.

Ejector 484, being powered by inert gas supplied through booster line 482, effectively drives drying gas received from outlet line 486 into a heater 490, in which that already warm drying gas can be further heated to raise its temperature higher and to lower its dew point for re-introduction into granular material drying hopper 472. The warm drying gas to be reheated and recirculated into hopper 472 travels from ejector 484 to heater 490 via a supply line 492.

Associated with and connected to heater 490 are a pair of thermocouples, where the pair has been denoted 494 in the drawing, a temperature controller 496, and a high temperature switch 498. The thermocouples and the temperature controller are connected to heater 490 by an electrical power and signal line 500. The warm, reheated drying gas is supplied from heater 490 to hopper 472 by a secondary drying gas feed line 502. A high temperature sensing switch 504 is mounted on secondary drying gas feed line 502 to provide indication of drying gas temperature being excessively high in the event of a malfunction of heater 490 or other malfunction upstream of secondary gas feed line 502. The reheated drying gas supplied by secondary gas feed line 502 enters hopper 472 via an upper portion of diffuser 470, designated 470U in FIG. 3.

An optional digital dew point monitor may be provided as a part of apparatus 410. The digital dew point monitor option is indicated by dotted line 506 and includes a line 508 for taking off a sample portion of heated drying gas passing downwardly through line 448. Takeoff line 508 supplies a sample of the heated drying gas through a valve 510 to a sensor 512, which senses dew point of the heated drying gas and provides a digital output indicative of the same. Takeoff line 508, after passing supplying gas to valve 510 and digital dew point sensor 512 reconnects with line 448 downstream of pressure regulator 458.

FIG. 3 illustrates microprocessor 604, provided to control operation of the apparatus illustrated in FIG. 3. As with the other microprocessors addressed respecting FIGS. 1 and 2, microprocessor 604 may be connected to the other components illustrated in FIG. 3 either by hardwire connection or by wireless connection such as Bluetooth and/or Internet. Further respecting FIG. 3, microprocessor 604 is operatively connected to inlet shutoff valve 414, differential pressure indicator 426, pressure indicator 428, low pressure switch 423, booster line control valve 434, pressure indicator 436, heater 438, membrane housing 442, control valve 454, pressure indicator 456, temperature controller 464, high temperature switch 466, high temperature switch 474, and desirably also to granular material outlet control valve 478, as well as temperature controller 496, temperature switch 498, and high temperature switch 504.

As regarding operation of the apparatus illustrated in FIG. 3 and the method for drying granular resin material as practiced by the apparatus of FIG. 3, the incoming, preferably compressed air, entering the system via air inlet 412 passes through first and second filters 416, 418 and proceeds to a first heater 438, which proceeds to heat the stream of incoming air to a temperature prescribed for operation of the gas separation membrane 443 within housing 442. The method proceeds with conduit 440 presenting the heated gas stream to membrane 443 which separates out oxygen size and smaller molecules to provide a stream of gas molecules of at least nitrogen size. The stream of at least nitrogen size gas molecules is provided via a discharge line 448. That stream is then split into two streams at an unnumbered "T", with one of the streams proceeding through a control valve 456 and a pressure regulator 458 to a heater 460, which is referred to as a second heater. Second heater 460 heats the stream of gas molecules of at least nitrogen size to a temperature selected to reduce dew point of the stream to a level effective for drying of the granular resin material. The heated stream of gas molecules is then introduced into the drying chamber 472 for upward flow through granular resin material in the chamber with the reduced dew point gas drying granular resin material in drying chamber 472 by drawing moisture therefrom during contact with the granular resin material. The method simultaneously proceeds with a second portion of the heated stream of nitrogen and larger molecules proceeding in booster line 482, passing through booster line control valve 434, and being provided as input power to venturi 484. Venturi 484 draws heating gas out of granular material drying hopper 472 and combines that heating gas with the gas powering venturi 484 to provide a secondary stream of heating gas via supply line 492 to a third heater 490. Within heater 490, this recycled stream of heating gas is heated again to reduce the dew point of the stream, whereupon the stream is provided via a secondary drying gas feed line 502 for recycle input to granular material drying hopper 472. Some of the heating gas is permitted to vent to atmosphere via line 479 as needed to maintain sufficient pressure within drying hopper 472.

In the claims, conduit 430 is sometimes referred to as a "first conduit" adapted for connection at one end thereof to the supply of compressed air entering at air inlet 412. Heater 438 is referred to as being a "first heater" for heating compressed air supplied thereto through the first conduit, namely conduit 430. The housing 442 is referred to as being a "housing", including a membrane such as membrane 443, receiving a heated portion of air from first heater 438 via outlet line 440. Within housing 442 membrane 443 has apertures of size allowing passage of gas molecules of oxygen and smaller, but funneling gas molecules that are too large for passage through the apertures through a heating gas outlet from housing 442 connected to discharge line 448. Conduit 448 leads to an unnumbered "T" at which the larger size gas molecules received from heated gas outlet of housing 442 are divided into two portions. A second heater, namely heater 460, serves to heat a first portion of the gas molecules received from the conduit 448 connected to the gas outlet of the housing 442.

The claims further refer to a drying hopper, which is hopper 472, serving to hold polymer resin to be dried with the resin drying hopper 472 receiving a first portion of gas molecules for drying the resin from a second heater, namely heater 460. Further regarding the apparatus aspect of the invention, ejector 484 receives a second portion of the larger size gas molecules from conduit 482 connected to the heating gas outlet of housing 442. A takeoff conduit numbered 486 connects an upper portion of the drying hopper 472 with ejector 484 for recycle flow of heating gas from the drying hopper 472 to ejector 484. A third heater 490 receives a mixture of recycled heating gas and a second portion of the larger size gas molecules from ejector 484, with a conduit supplying this recycle heated gas blend from third heater 490 to drying hopper 472.

In the claims, heaters 38, 60, and 90 are sometimes referred to respectively as "first", "second", and "third" heaters.

In the drawings, FIG. 1 represents the simplest apparatus form of the invention, namely a "single flow, single inlet" configuration. In the configuration of the apparatus of the invention illustrated in FIG. 1, nitrogen is produced and introduced at a single point at the bottom of granular material drying hopper 272 and exits from the top of hopper 272 without any recirculation.

FIG. 2 presents the apparatus of the invention in a "dual flow, single inlet" configuration in which nitrogen is introduced at a single point into the granular material drying hopper 72 at a lower inlet point of the drying hopper 72 but with recirculation in an upper loop, defined in part by conduit 82, with air being used to power the venturi, thereby recirculating about 80% of the resulting nitrogen/air mixture into drying hopper 72.

FIG. 3 illustrates the apparatus of the invention in a "dual flow, dual inlet" configuration in which nitrogen flows into drying hopper 472 at a bottom point and also powers the venturi. In the configuration of the apparatus illustrated in FIG. 3, no air is introduced into drying hopper 472 through the venturi and a higher purity of inert drying gas is maintained in the upper recirculation loop defined in part by line 486 leading from drying hopper 470 to venturi 484.

Referring to FIGS. 1, 2, and 3, compressed air provided at air inlets 12, 212, 412 typically ranges from about 60 psig to about 125 psig with the temperature ranging from about 30° F. to about 130° F. and the dew point being less than 85° F. Depending on the size of the line defining air inlets 12, 212, 412 and the pressure of the compressed air, air flow rates at the air inlet may range from 3 SCFM or less up to 22 SCFM, or even more.

Primary and secondary filters 16, 216, 416, 18, 218, 418 are effective to cleanse the compressed air of oil and particulate matter.

Referring to FIG. 1, air leaving heater 238 via line 240 and entering housing 242 is typically at a temperature from about 80° F. to about 140° F. Pressure of the air in line 240 is typically the same as the pressure of compressed air entering via air inlet 212. The heating gas exiting housing 242, after being divided out of the input air by membrane 243, with that gas traveling through line 248 in FIG. 1, is typically from about 55 psig to about 120 psig, at a temperature of about 80° F. to about 130° F. and at a dew point of from about −20° F. to about −100° F. Typically, this heating gas, after processing by membrane 243, typically has an oxygen content of only about 0.5 to 5.0% by volume. After the heating gas passes through control valve 254 and expands, pressure of the heating gas is typically from 0.1 psig to 0.5 psig, while the temperature of the heating gas remains between about 80° F. and about 130° F. and the dew point drops to be in the range of from about −40° F. to about −120° F.

After passing through second heater 260 and traveling through gas feed line 268, heating gas supplied to drying hopper 272 ranges from about 80° F. to about 350° F., depending on the heat supplied thereto by second adjustable heater 260. Still referring to FIG. 1, gas vented via exhaust 279 to ambient is at atmospheric pressure and exits drying hopper 272 at a rate of about 80% to nearly 100% of the inlet flow rate. The reduced flow rate is effective to maintain pressure differential within drying hopper 272, thereby to continue the supply of heating gas under pressure to drying hopper 272. Dew point of gas exhausting to ambient 279 ranges from about −40° F. to about −120° F., again depending on the drying temperature selected for the particular polymer in drying hopper 272.

Referring to FIG. 2, conditions for compressed air coming into the apparatus at inlet 12 are essentially the same as those recited for FIG. 1. Similarly, compressed air in line 40 exiting first heater 38 and traveling to housing 42 through line 40 is typically at about 80° F. to about 130° F., similarly to the air traveling from heater 238 to housing 242 in FIG. 1.

Still referring to FIG. 2, heating gas having been processed by membrane 43, leaving housing 42 and traveling via line 48 has properties similar to the conditions set forth above regarding FIG. 1, namely a pressure of between about 55 psig and about 120 psig, temperature between about 80° F. and about 130° F., dew point in the range of from about −20° F. to about −100° F. and oxygen content of about 0.5 to 8.0% by volume. Heating gas, having passed through pressure control valve 54 via discharge line 48, is in the range similar to that set forth above regarding FIG. 1, namely a pressure of 0.1 psig to 0.5 psig, temperature from about 80° F. to about 130° F. and dew point in the range of from about −40° F. to about −120° F. Heating gas leaving second heater 60 and traveling via gas feed line 68 to granular material drying hopper 72 is in the range of from about 80° F. to about 350° F., depending on the polymer being dried in drying hopper 72.

Flow of gas exhausting to ambient via exhaust 79 is at a vent flow rate of about 30% to about 80% of the inlet flow rate, with an oxygen content of 0.5% to 8.0% by volume, with gas discharge being at atmospheric pressure, with the discharge gas being less than the drying temperature, and with the discharge gas having a dew point of from about −40° F. to about −120° F. Still referring to FIG. 2, air in booster line 82 typically ranges in pressure from about 20 psig to about 80 psig as the booster air is provided to air ejector 84. Third heater 90 is adjusted to provide combined recycled gas and air flow via secondary drying gas feed line 102 to granular material drying hopper 72 at the prescribed temperature for drying the particular polymer in hopper 72.

Referring to FIG. 3, conditions at air inlet 412 are typically in the ranges described above respecting FIGS. 1 and 2. The same is true of the heated compressed air traveling from first heater 438 to housing 442 through line 440. Pressure of heating gas downstream of pressure regulating valve 454 is in the same range as described above respecting FIGS. 1 and 2, as are temperature and dew point. Similarly, heating gas supplied to granular resin material dryer 472 via heating gas supply line 468 ranges from about 80° F. to about 350° F., depending on the polymer being dried. Heating gas, namely nitrogen, splitting at the "T" in discharge line 448, and after traveling through a pressure regulating valve 434, will then typically be from about 20 psig to about 80 psig. This heating gas is essentially pure nitrogen, having an oxygen content from 0.5 to about 5% by volume. Consequently, nitrogen at between 20 psig and 80 psig, depending on the selected conditions of operation for the system, is provided to ejector 484. Outlet flow via exhaust 479 is desirably between 30% and 80% of the inlet flow rate. Oxygen content of the outlet flow is typically between 0.5 and 5.0% by volume. The outlet flow is at atmospheric temperature and is below the drying temperature within drying hopper 472. The dew point of the outlet flow is between about −40° F. and about −120° F.

Membranes 43, 243, 443 operate successfully at various temperatures and pressures. As pressure of the incoming compressed air may increase, typically up to a maximum of about 125 psig to 130 psig, membrane performance improves with less and less oxygen being present in the output stream consisting essentially of nitrogen.

A customary average pressure of incoming compressed air is about 100 psig, which is most common in industrial, in-house air systems.

Membrane performance also improves as temperature increases, up to about 130° F. Heaters 38, 238, 438 are all adjustable so that the temperature of compressed air supplied to membranes 43, 243, 443 is adjusted by the associated microprocessors 600, 602, 604 to optimize membrane performance.

In the preferred course of operation, pressures downstream of membranes 43, 243, 443 are reduced by gas expansion to nearly atmospheric. All that is required respecting drying gas pressure is that drying gas pressure downstream of membranes 43, 243, 443 be sufficient to overcome pressure in drying hoppers 72, 272, 472 so that the drying gas moves into the drying hoppers. Typically, pressure in drying hoppers 72, 272, 472 ranges from 3 to 20 inches of water. Vents 79, 279, 479 from drying hoppers 72, 272, 472 vent at whatever coincides with local atmospheric pressure. Accordingly, pressure at the drying hopper inlets is slightly higher than local atmospheric while exhaust from the drying hoppers via vents 79, 279, 479 is at local atmospheric pressure.

With the inventive nitrogen drying, drying temperatures for a given polymer being dried can be 10 to 15 degrees higher than known and used heretofore.

The invention desirably uses the full pressure of the compressed air system in the local facility and applies that pressure to membranes 43, 243, 443. During operation, pressure is reduced to nearly atmospheric downstream of gas separation membrane 43, 243, 443 to deliver the desired drying gas to drying hoppers 72, 272, 472.

Since dew point is a function of pressure, sometimes a dew point as low as about −18° F. can be achieved with 100 psig compressed air without heating the air; a dew point of about −40° F. is reached once the inert drying gas is expanded to atmospheric pressure downstream of membranes 43, 243, 443. Operating at a low, near atmospheric, pressure is advantageous in that it provides lower dew point drying gas, and therefore greater drying efficiency than known heretofore, with a concomitant increase in safety.

A further reduction in dew point is achieved by heating the drying gas using heaters 60, 90, 260, 290, 460, and 490. The heaters shown in the drawings, namely heaters 38, 60, 90, 238, 260, 290, 438, 460, and 490 are all adjustable, are preferably controlled by microprocessors 600, 602, 604 using temperature sensors, some of which are not illustrated in the drawings to enhance drawing clarity. These such temperature sensors are positioned in the air and gas flow lines upstream and downstream of the respective heaters, to effectuate control of the temperature of the drying gas and air streams by microprocessors 600, 602, 604, to provide the most efficient polymer drying possible. These temperature sensors connected to and operating together with microprocessors 600, 602, 604 facilitate production of optimal, differing temperatures for the drying gas input to drying hoppers 72, 272, 472, which is often desirable according to atmospheric conditions and/or according to the polymer being dried.

The following table presents performance data for practice of the invention in select configurations and capacity constructions:

| Granular Resin Throughput (pounds/hour) | Input Compressed Air Flow (SCFM) | Power System Demand (kilowatts) | System Power Usage (kilowatts) | Drying Hopper Volume (cubic feet) | Drying Hopper Capacity (pounds of resin) |
|---|---|---|---|---|---|
| 7 | 2.6 | 1.8 | 0.21 | 0.5 | 20 |
| 25 | 5.7 | 1.8 | 0.46 | 1.85 | 60 |
| 50 | 11.9 | 6.1 | 1.0 | 4.2 | 150 |

The numbers in the table set forth above for throughput are for processing polycarbonate pellets having a density of 38 pounds per cubic foot. The system power usage figure is power usage at a temperature of 180 degrees in the drying hopper, drying polycarbonate pellets. In the course of operation the invention can provide a constant flow of about −75° F. dew point drying gas, or even drier drying gas, with a startup time of less than four minutes. The temperature in the drying hopper can be up to about 350° F. In one practice of the invention, according to the foregoing as set forth in the table, the −75° F. dew point nitrogen is provided at standard process temperatures in the drying hopper of up to about 350° F. Microprocessors 600, 602, 604, as illustrated in the drawings, regulate operation of the heaters, the supply of drying gas, and the supply of polymer material to be dried.

Although schematic implementations of the invention and at least some of its advantages are described in detail hereinabove, it should be understood that various changes, substitutions and alterations may be made to the apparatus and methods disclosed herein without departing from the spirit and scope of the invention as defined by the appended claims. The disclosed embodiments are to be considered in all respects as being illustrative and not restrictive, with the scope of the invention being indicated by the appended claims rather than by the foregoing description. All changes coming within the meaning and range of equivalency of the claims are intended to be embraced therein. Moreover, the scope of this patent application is not intended to be limited to the particular implementations of apparatus and methods described herein, nor to any methods that may be described or inferentially understood by those skilled in the art to be present herein.

As discussed above and from the foregoing description of an exemplary embodiment of the invention, it will be readily apparent to those skilled in the art to which the invention pertains that the principles and particularly the compositions and methods disclosed herein can be used for applications other than those specifically mentioned. Further, as one of skill in the art will readily appreciate from the description of the invention as set forth hereinabove, apparatus, methods, and steps presently existing or later developed, which perform substantially the same function or achieve substantially the same result as the embodiments described and disclosed hereinabove, may be utilized according to the description of the invention and the claims appended hereto. Accordingly, the appended claims are intended to include within their scope such apparatus, methods, and processes that provide the same advantage or result, or which are, as a matter of law, embraced by the doctrine of the equivalents respecting the claims of this application.

In the description above an in claims, the terms "line" and "conduit" are used interchangeably to denote a pipe-like structure that connects the various components for flow of air, nitrogen, and other inert gas therethrough in the course of the heating and drying processes.

As respecting the claims appended hereto, the term "comprising" means "including but not limited to", whereas the term "consisting of" means "having only and no more", and the term "consisting essentially of" means "having only and no more except for minor additions which would be known to one of skill in the art as possibly needed for practice of the claimed invention." The scope of the invention is, therefore, indicated by the appended claims rather than by the foregoing description and all changes that come within the range of equivalency of the claims are to be considered to be embraced by the claims. Additional objects, other advantages, and further novel features of the invention will become apparent from study of the appended claims as well as from study of the foregoing discussion and description of the invention, as that study proceeds.

The following is claimed:

1. A method for drying a granular resin material in a chamber, comprising:
    a) heating compressed air to a temperature prescribed for operation of a gas separation membrane;
    b) after heating the compressed air, presenting the compressed air to the gas separation membrane to separate out oxygen-size and smaller molecules to provide a stream of gas molecules of at least nitrogen-size at a pressure substantially that of the compressed air;
    c) reducing the pressure of the stream of gas molecules of at least nitrogen-size to less than 1.0 psig;
    d) heating the stream of gas molecules of at least nitrogen-size to a temperature at which a dew point of the stream of gas molecules of at least nitrogen-size is no higher than −40 degrees F.; and
    e) after heating the stream of gas molecules of at least nitrogen-size, introducing the stream of gas molecules of at least nitrogen-size into the chamber for upward flow toward the atmosphere and through the granular resin material in the chamber, the stream of gas molecules of at least nitrogen-size drying the granular resin material in the chamber by drawing moisture therefrom during contact therewith.

2. A method for drying a granular resin material in a chamber, comprising:
    a) dividing a stream of compressed air into a first stream of the compressed air and a second stream of the compressed air;
    b) heating the first stream of the compressed air to a temperature prescribed for operation of a gas separation membrane;
    c) after heating the first stream of the compressed air, presenting the first stream of the compressed air to the membrane to separate out oxygen-size and smaller molecules to provide a stream of gas molecules of at least nitrogen-size;
    d) allowing the stream of gas molecules of at least nitrogen-size to expand thereby reducing a pressure of the stream of gas molecules of at least nitrogen-size to less than 1.0 psig;
    e) heating the stream of gas molecules of at least nitrogen-size to a temperature at which a dew point of the stream of gas molecules of at least nitrogen-size is no higher than −40 degrees F.;
    f) after heating the stream of gas molecules of at least nitrogen-size, introducing the stream of gas molecules of at least nitrogen-size into the chamber for upward flow toward the atmosphere and through the granular resin material in the chamber, the stream of gas molecules of at least nitrogen-size drying the granular resin material in the chamber by drawing moisture therefrom during contact therewith;
    g) drawing a portion of the stream of gas molecules of at least nitrogen-size out of the chamber at a point between introduction of the stream of gas molecules of at least nitrogen-size into the chamber and venting of the chamber to the atmosphere, using an ejector powered by the second stream of the compressed air;
    h) combining at least a part of the second stream of the compressed air with the portion of the stream of gas molecules of at least nitrogen-size drawn from the chamber to produce a combined flow;
    i) heating the combined flow to reduce a dew point of the combined flow; and
    j) after heating the combined flow, introducing the combined flow into the chamber to join the upward flow of the stream of gas molecules of at least nitrogen-size toward the atmosphere and through the granular resin material in the chamber, further drying the granular resin material in the chamber by drawing moisture therefrom during contact therewith.

3. A method for drying a granular resin material in a chamber, comprising:
    a) heating air to a temperature prescribed for a gas separation membrane;
    b) after heating the air, presenting the air to the gas separation membrane to separate out oxygen-size and smaller molecules to provide a collection of gas molecules of at least nitrogen-size;
    c) dividing the collection of gas molecules of at least nitrogen size into a first portion of gas molecules and a second portion of gas molecules;
    d) allowing the first portion of gas molecules to expand thereby reducing a pressure of the first portion of gas molecules to less than 1.0 psig;
    e) heating the first portion of gas molecules to a temperature selected to reduce a dew point of the first portion of gas molecules to no higher than minus 40 degrees F.;
    f) after heating the first portion of gas molecules, introducing the first portion of gas molecules into the chamber for upward flow toward atmosphere and through the granular resin material in the chamber, the first portion of gas molecules drying the granular resin material in the chamber by drawing moisture therefrom during contact therewith;
    g) drawing some of the first portion of gas molecules out of the chamber at a point between introduction of the first portion of gas molecules into the chamber and venting of the chamber to the atmosphere, using an ejector powered by the second portion of gas molecules;

h) combining the second portion of gas molecules with the some of the first portion of gas molecules drawn from the chamber to produce a combined flow;

i) heating the combined flow, to reduce a dew point of the combined flow; and j) after heating the combined flow, introducing the combined flow into the chamber to join the upward flow of the first portion of gas molecules toward the atmosphere and through the granular resin material in the chamber, further drying the granular resin material in the chamber by drawing moisture therefrom during contact therewith.

4. Apparatus for drying polymer resin prior to molding or extrusion, comprising:

a) a first conduit adapted for connection at one end thereof to a supply of compressed air;

b) a first heater for heating compressed air supplied thereto through the first conduit;

c) a housing including a membrane receiving heated compressed air from the heater, the membrane having apertures therethrough of size allowing passage of gas molecules of oxygen size and smaller, the housing having internal structure allowing release to ambient of gas molecules passing through the apertures while funneling gas molecules too large for passage through the apertures to a heating gas outlet;

d) a conduit connected to the housing and receiving a stream of the large size gas molecules therefrom;

e) a valve positioned in the conduit for reducing pressure of the received gas stream to less than 1 psig;

f) a second heater for heating the reduced pressure gas received from the conduit to a dew point no greater than minus 40 degrees F.; and g) a resin drying hopper for holding polymer resin to be dried, the resin drying hopper receiving the heated reduced pressure gas from the second heater, for drying the resin.

5. Apparatus for drying a polymer resin prior to molding or extrusion, comprising:

a) a first conduit adapted for connection at one end thereof to a supply of compressed air, and for dividing the supply of compressed air into a first portion of the compressed air and a second portion of the compressed air;

b) a first heater configured to heat the first portion of the compressed air supplied thereto through the first conduit;

c) a housing including a membrane configured to receive the first portion of the compressed air from the first heater, the membrane having apertures therethrough of size allowing passage of gas molecules of oxygen size and smaller, the housing having an internal structure allowing release to ambient of the gas molecules of oxygen size and smaller passing through the apertures while funneling a stream of larger gas molecules too large for passage through the apertures to a heating gas outlet of the housing;

d) a second conduit connected to the heating gas outlet of the housing and configured to receive the stream of larger gas molecules from the housing;

e) a valve positioned in the second conduit and configured to reduce a pressure of the stream of larger size gas molecules to less than 1 psig;

f) a second heater configured to heat the stream of larger size gas molecules received from the heating gas outlet of the housing via the second conduit to a temperature at which a dew point of the the stream of larger size gas molecules is no greater than minus 40 degrees F.;

g) a resin drying hopper configured to hold the polymer resin to be dried, and to receive the stream of larger size gas molecules from the second heater;

h) an ejector configured to receive the second portion of the compressed air;

i) a third conduit connected to an upper portion of the resin drying hopper and the ejector and configured to direct a portion of the stream of larger size gas molecules from the resin drying hopper to the ejector;

j) a third heater configured to receive and heat a mixture of the portion of the stream of larger size gas molecules and the second portion of the compressed air from the ejector; and k) a fourth conduit configured to direct the mixture of the portion of the stream of larger size gas molecules and the second portion of the compressed air from the third heater to the resin drying hopper.

6. Apparatus for drying a polymer resin prior to molding or extrusion, comprising:

a) a first conduit adapted for connection at one end thereof to a supply of compressed air;

b) a first heater configured to heat the compressed air supplied thereto through the first conduit;

c) a housing including a membrane configured to receive the compressed air from the first heater, the membrane having apertures therethrough of size allowing passage of gas molecules of oxygen size and smaller, the housing having an internal structure configured to allow release to the ambient environment of smaller size gas molecules small enough for passage through the apertures while funneling larger size gas molecules too large for passage through the apertures to a heating gas outlet of the housing;

d) a second conduit connected to the heating gas outlet of the housing and configured to receive the larger size gas molecules from the heating gas outlet of the housing, and to divide the larger size gas molecules into a first portion of the larger size gas molecules and a second portion of the larger size gas molecules;

e) a valve positioned in the second conduit and configured to reduce a pressure of the first portion of the larger size gas molecules to less than 1 psig;

f) a second heater configured to heat the first portion of the larger size gas molecules to a temperature at which dew point of the first portion of the larger size gas molecules is no greater than minus 40 degrees F.;

g) a drying hopper configured to hold the polymer resin to be dried, and to receive the first portion of the larger size gas molecules for drying the resin from the second heater;

h) an ejector configured to receive the second portion of the larger size gas molecules from the second conduit connected to the heating gas outlet of the housing;

i) a third conduit connected to an upper portion of the drying hopper and the ejector and configured to recycle some of the first portion of the larger size gas molecules from the drying hopper to the ejector;

j) a third heater configured to receive a mixture of the some of the first portion of the larger size gas molecules and the second portion of the larger size gas molecules from the ejector; and k) a fourth conduit configured to supply the mixture of the some of the first portion of the larger size gas molecules and the second portion of the larger size gas molecules from the third heater to the drying hopper.

\* \* \* \* \*